Oct. 13, 1942.  W. E. SCHWARZMANN ET AL  2,298,652
MAGNET STATOR STRUCTURE FOR MAGNETOS
Filed April 26, 1941  2 Sheets-Sheet 1
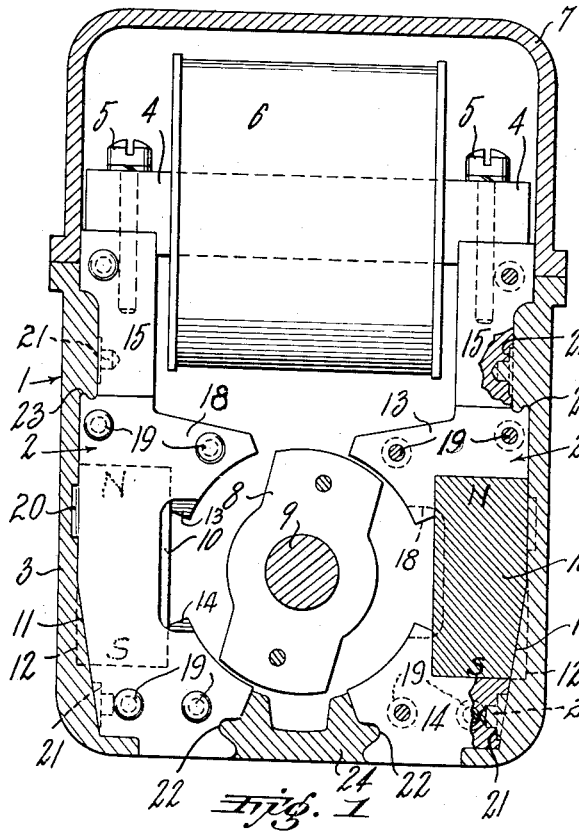
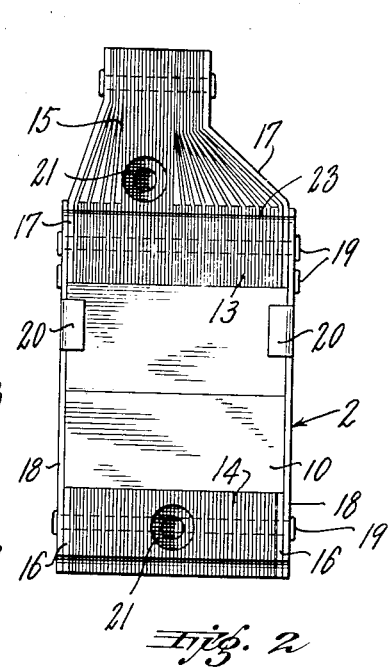
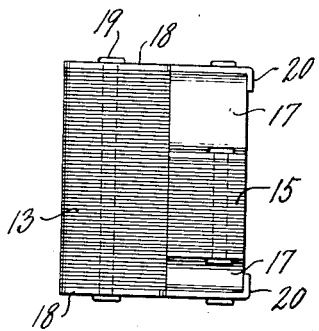
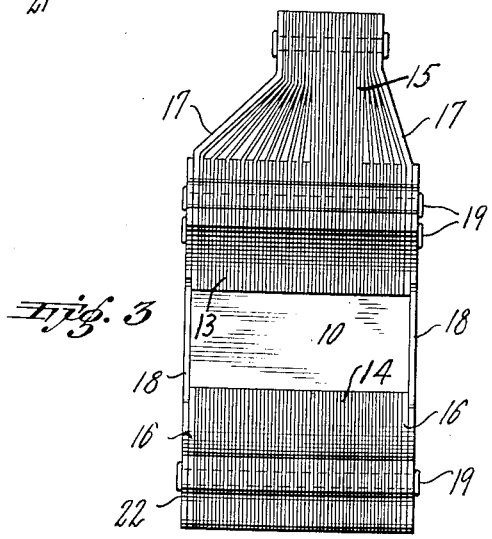
Wolfgang E. Schwarzmann
& Charles Strniste  INVENTORS
BY
Leon N. Lowenthal
ATTORNEY Oct. 13, 1942. W. E. SCHWARZMANN ET AL 2,298,652
MAGNET STATOR STRUCTURE FOR MAGNETOS
Filed April 26, 1941 2 Sheets-Sheet 2
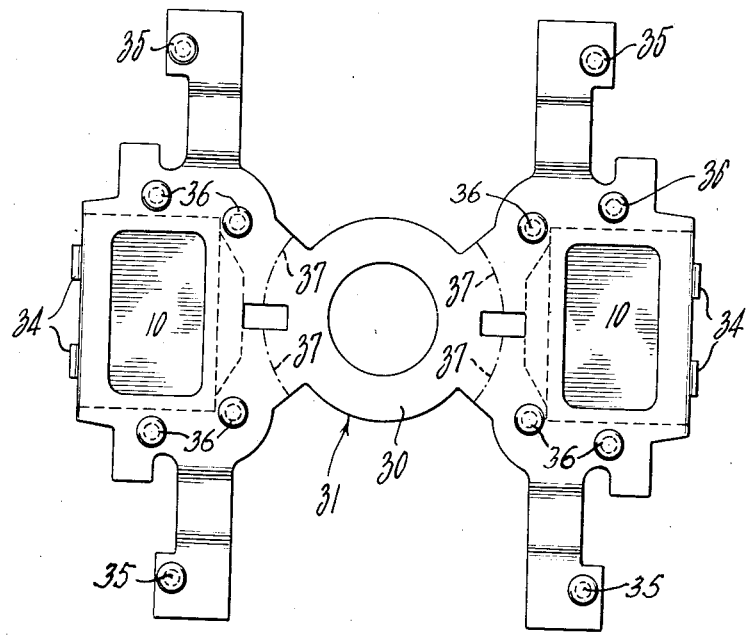
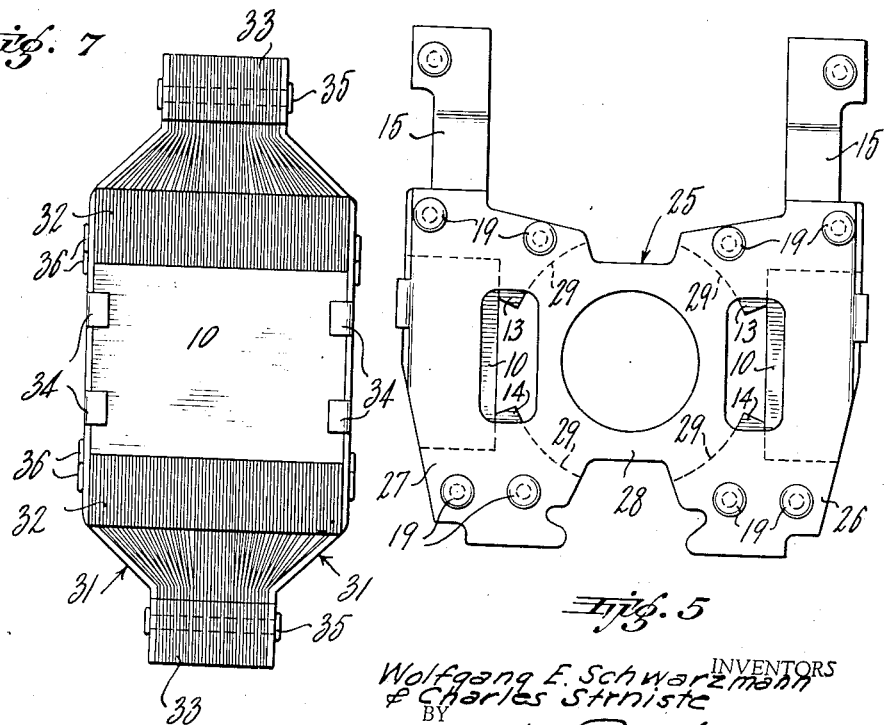
Wolfgang E. Schwarzmann
& Charles Strniste INVENTORS
BY
ATTORNEY Patented Oct. 13, 1942

2,298,652

UNITED STATES PATENT OFFICE 2,298,652

MAGNET STATOR STRUCTURE FOR MAGNETOS

Wolfgang E. Schwarzmann, Longmeadow, and Charles Strniste, Agawam, Mass., assignors to American Bosch Corporation, Springfield, Mass., a corporation of New York Application April 26, 1941, Serial No. 390,474

12 Claims. (Cl. 171—209)

This invention relates to magnet stator structures adapted to be fastened as a unit in the frame of a magneto in predetermined fixed position therein for association with the rotor and the stationary generating coil or coils of the magneto, and particularly to such a structure comprising one or more permanent magnets of bar form each having at least two pole shoes which are free from direct attachment to the magnet and which extend over its respective polar ends to form a structural unit therewith solely by clamping the ends of the magnet between the pole shoes as by means of one or more tie plates fastened exclusively to both pole shoes.

One object of the invention is to incorporate in such a stator structure for a magneto of the type having a rotary flux distributor, an arm projecting from one of the pole shoes of one magnet, or from the poles of two displaced magnets, for magnetic contact with the core of the stationary generating coil, or to incorporate arms projecting in opposite directions from the pole shoes of one or both magnets for magnetic contact with the respective cores of two stationary generating coils.

Another object is to incorporate in a stator structure in which two or more displaced magnets are provided to form the complete stator tunnel for the rotary flux distributor, one or two tie plates each fastened to the pole shoes of all the magnets so as to clamp each set of pole shoes over the ends of its magnet, and each tie plate having a bridge or connecting member, preferably integral, which connects all magnets with their pole shoes thereon in a structural unit and which is thereafter cut away to provide for the assembly of the flux distributor in the tunnel.

Another object is to provide pole shoes and tie plates of such construction and arrangement that the magnet is clamped more rigidly and preferably is held against displacement in all directions in the stator structure before and during the period of fastening the structure in the frame of a magneto of this general type.

Still another object is to provide, if desired, tie plates of a form which in some cases can be used in duplicate on the two end faces of the pole shoes notwithstanding the design of the pole shoes; and also to provide in some cases of laminated pole shoes, tie plates which eliminate the necessity for the usual thick outer laminations of the stack.

Other objects and advantages will be understood from the following description taken in connection with the accompanying drawings, showing, as examples, magnet stator structures which are adapted particularly for magnetos for electrical ignition at the spark plugs of internal combustion engines, and which have laminated pole shoes arranged on the polar ends of substantially straight bar magnets with duplicate non-magnetic tie plates along the side faces of the magnets and pole shoes. In the drawings:

Fig. 1 is a vertical section of a flange-mounted magneto employing two duplicate magnet stator structures of the invention cast in a frame of an aluminum-zinc alloy in a die cast mold, with some interior parts of the magneto in section and some in elevation; Fig. 2 is an elevation of the rear face of either one of the structural units of Fig. 1 before being cast in the frame; Fig. 3 is an elevation of the front face of the structure of Fig. 2; Fig. 4 is a top plan thereof; Fig. 5 shows in side elevation a structural unit having two displaced magnets with pole shoes for subsequently casting in a similar frame but in a sand cast mold; Fig. 6 shows in side elevation a structural unit with displaced magnets for subsequently casting in the frame of a double magneto in a sand cast mold, wherein the oppositely extending arms of the tie plates eliminate the usual heavier outer laminations of the pole shoe stacks; and Fig. 7 is a view of the structure of Fig. 6 in elevation from the rear face of either magnet.

Referring particularly to Fig. 1, the magneto, generally indicated by the reference numeral 1, has two identical permanent magnet structures 2 which were cast in a frame 3, of the usual aluminum-zinc alloy in the well known way in a die cast mold and which has the usual laminated coil core 4. This core is fastened by screws 5 in bridging relation with the structures 2 and carries the usual form of high tension generating coil 6. The non-magnetic cover 7 of the magneto is fastened in any suitable way to the frame 3 to complete the housing of the interior parts of the magneto, including a laminated flux distributor rotor 8 fastened to shaft 9 for rotation in the stator tunnel of the magneto in bearings carried by the magnet frame in the well-known way.

Each of the two structures 2, as shown cast in the frame 3 in Fig. 1 and in Figs. 2, 3 and 4 before being cast in, comprises a permanent magnet 10 of flat bar form with its polar ends or top and bottom polar faces ground flat in substantially parallel planes, and with a bevel at 11 on its lower rear face which may, if desired, be omitted as indicated by the broken line at 12. According to the magnetic circuit herein disclosed, the magnets are magnetized so as to provide an upper pole N and a lower pole S. The set of upper and lower pole shoes 13 and 14 of each magnet 10 extend over the opposite polar ends thereof. Each lower pole shoe 14 is composed of a stack of the usual thin (about .014″) steel laminations with one surface in flat contact with the bottom end face of its magnet and with another surface extending upwardly over a part of the ground inner face of the magnet. Each upper pole shoe 13 is composed of a stack of similar laminations with a portion in contact with the upper end face of its magnet and with another portion extending downwardly over the inner face thereof. Certain laminations of pole shoe 13 have integral portions forming an upstanding arm 15. The laminations of both pole shoes 13 and 14 are compacted throughout but, as shown particularly in Figs. 2 and 3, some of the intermediate laminations of pole shoe 13 are cut off at the place where the remaining ones start to bend to form, with the compacted central laminations, a compacted top portion in magnetic contact with the coil core 4. At the outer faces of the stacks are relatively thick (about .050″) steel laminations 16 and 17 to give added rigidity thereto, each pole shoe being about the width of the magnet.

Over the outer laminations 16, 17, preferably on both sides of the laminated stacks and extending along the side faces of each magnet 10, to prevent sidewise movement of the magnet in the structural unit before casting, are brass tie plates 18 extending beyond the ends of the magnet and unattached to the magnet in any way but fastened exclusively to its set of upper and lower pole shoes 13, 14 by means of the rivets 19 which also fasten the laminations of the pole shoes in respective stacks. Although the pole shoes are thus free from direct attachment to the magnet 10, they are rigidly held by the tie plates, in a structural unit, solely by clamping the magnet at the ends thereof between the pole shoes preferably by making the rivet holes in the tie plates oversize and forcing the pole shoes tightly against the magnet while heading-over the rivets. Furthermore, each tie plate 18 has a projecting portion 20 bent over against the rear face of its magnet to hold the magnet still more securely in position, between those projecting portions and the portions of the pole shoes 13 and 14 projecting toward each other over the front face of the magnet. In order that the tie plates 18 may be duplicates in magnet structures in which the arms 15 of the upper pole shoes are bent as in Figs. 2 and 3, the tie plates extend upwardly only to that point at which the laminations start to bend; and owing to the absence of a tie plate above that point, the stacks are preferably provided with the thicker outer laminations 16, 17. As shown particularly in Fig. 1, the inwardly projecting portions of the pole shoes 13 and 14 have arcuate polar faces ground to proper diameter to form a tunnel for the rotor 8 of the magneto.

The depressions 21 in the rear of the upper and lower pole shoes 13 and 14 assist in locating the magnet structures in the die casting mold. Furthermore, each lower pole shoe has a groove at 22 and each upper pole has a groove at 23, while the tie plates 18 have grooves conforming thereto, to form anchors effectively interlocking with the metal of the frame 3 including the bottom portion 24 thereof.

In the event that the magnet stator structure is to be cast in an aluminum-zinc alloy in a sand cast mold, the depressions 21 need not be provided and the two displaced magnets 10 with their sets of pole shoes 13, 14 may, as shown in Fig. 5, be held together by duplicate brass tie plates, each generally indicated by 25. Each tie plate comprises two like portions 26 and 27 similar to the tie plates 18 of Figs. 1–4 but connected by an integral cross member 28 which has a central opening for locating the magnet stator structure in a sand cast mold and which is subsequently cut away along the broken lines 29.

The embodiment of Figs. 6 and 7 also is intended as a magnet stator structure to be cast as a unit in an aluminum-zinc alloy frame in a sand cast mold. The integral cross member 30 of the brass tie plate generally indicated by 31 is likewise provided for holding both magnets 10 with their pole shoes thereon in a structural unit and for locating the unit in the mold. However, each pole shoe 32 has, in addition to the portions projecting toward each other over the front face of the magnet, the arms 33 extending into magnetic association with respective coil cores (not shown) to provide a double magneto with two generating coils. These arms are bent symmetrically along a central vertical line so that the two tie plates are duplicates even though they extend to the outer ends of the arms. Thus, the thicker outer laminations of the pole shoe stacks may be omitted to thereby simplify the construction without sacrificing needed strength. In this embodiment also, each tie plate 31 has two projections 34 bent over the rear face of magnet 10, and the end rivets 35 as well as the others 36, fasten the tie plate to both sets of pole shoes to clamp the respective magnets therebetween and fasten the laminations in respective stacks. In this embodiment, also, the cross member 30 is cut away on the broken lines 37 upon machining the frame.

In all embodiments herein, the tie plates are intended to clamp the pole shoes on the opposite ends of the magnet in good surface magnetic contact therewith, but in the event there is a space between the pole shoes and the polar ends of the magnet, that gap is always so slight as to have a negligible influence on the performance of the magneto even though some metal flows into the gap in the casting process. In fact, it has been determined that any such decrease of magnetic flux through the coil core or cores resulting from this increase in the total reluctance of the magnetic circuit, including the air gaps of the rotor, is less than that resulting from the reduction of magnetomotive force of the magnets due to the effects of the high temperature in welding the pole shoes thereto. In other words, the magnet stator structures of the embodiments herein, in which the magnets are clamped between the pole shoes, have been found to result in magnetos of better performance than previous magnetos in which the pole shoes are welded to the magnets. Furthermore, a considerable reduction in cost, and simplification in manufacture, has been accomplished by this clamping arrangement.

It is to be understood that the expression permanent magnet is intended to cover permanent magnet material whether magnetized in the unitary structure or only after the completion of the magneto assembly.

It will be obvious that many and various modifications may be made in the embodiments of the invention herein disclosed, and that the magnet stator structures herein disclosed may be utilized in magnetos of kinds and types other than herein shown. For instance, the magnet stator structure of Figs. 2-4 for a die cast frame may be modified as shown in Figs. 6 and 7 for a sand cast frame, and also it may be modified to provide for a second generating coil in a double magneto, or vice versa. Furthermore, the idea herein disclosed of clamping a magnet at the ends thereof between the pole shoes by means of one or two tie plates like those herein shown may be applied to magnetos having other types of magnetic circuits, or to those generating a different number of current impulses per rotation, or to those of oscillating, flywheel or other types in which the magnet or magnets are of straight or curved bar form and may rotate within or outside a normally stationary coil or coils, and for uses other than in electric ignition systems for internal combustion engines. Also, the magnet structures herein disclosed may use solid pole shoes and the tie plates may be fastened to the poles by means other than rivets. Also the portion of the tie plates need not extend along a face of the magnet and therefore need not be nonmagnetic. Also, the magnet stator structure need not be cast in a magneto frame, but may be fastened thereto as a structural unit by screws or other fastening means. It is therefore apparent that the terms and substance of the appended claims should have the broadest interpretation consistent with the invention herein disclosed.

Having thus described the invention, what is claimed is:

1. A magnet stator structure which is constructed and arranged to be fastened as a unit in predetermined fixed position in the frame of that type of magneto having a rotary flux distributor and a stationary generating coil and which includes the following members: a permanent magnet of bar form having opposite polar ends; pole shoes which are arranged on respective ends of the magnet free from direct attachment thereto so as to form a portion of a tunnel for the flux distributor and of which one pole shoe has a projecting arm adapted for magnetic contact with the core of the generating coil; and a tie plate which is fastened exclusively to the pole shoes and which clamps the ends of the magnet between the pole shoes to form a structural unit of the members.

2. A magnet stator structure which is constructed and arranged to be fastened as a unit in predetermined fixed position in the frame of that type of magneto having a rotary flux distributor and a stationary generating coil and which includes the following members: a permanent magnet of bar form having opposite polar ends; pole shoes which are arranged on respective ends of the magnet free from direct attachment thereto so as to form a portion of a tunnel for the flux distributor; and a tie plate which is fastened exclusively to the pole shoes by rivets extending through the tie plate and the respective pole shoes and which has rivet holes larger than those through the pole shoes so that the compressed rivets hold the pole shoes in tight clamping position on the ends of the magnet to form a rigid structural unit of the members.

3. A magnet stator structure which is constructed and arranged to be fastened as a unit in predetermined fixed position in the frame of that type of magneto having a rotary flux distributor and stationary generating coils and which includes the following members: a permanent magnet of bar form having opposite polar ends; pole shoes which are arranged on respective ends of the magnet free from direct attachment thereto so as to form a portion of a tunnel for the flux distributor and which have oppositely projecting arms adapted for magnetic contact with cores of respective generating coils; and a tie plate which is fastened exclusively to the pole shoes and which clamps the ends of the magnet between the pole shoes to form a structural unit of the members.

4. A magnet stator structure which is constructed and arranged to be fastened as a unit in predetermined fixed position in the frame of that type of magneto having a rotary flux distributor and a stationary generating coil and which includes the following members: a permanent magnet of bar form having opposite polar ends; pole shoes which are arranged on respective ends of the magnet free from direct attachment thereto and at least one of which has a portion projecting over the front face of the magnet so as to form a portion of a tunnel for the flux distributor; and a tie plate which is fastened exclusively to the pole shoes and clamps the ends of the magnet between the pole shoes to form a structural unit of the members and which has a portion extending over the rear face of the magnet to hold the magnet between it and the front portion of the pole shoe.

5. A magnet stator structure which is constructed and arranged to be fastened as a unit in predetermined fixed position in the frame of that type of magneto having a rotary flux distributor and a stationary generating coil and which includes the following members: a permanent magnet of bar form having opposite polar ends; pole shoes which are arranged at respective ends of the magnet free from direct attachment thereto and at least one of which has a portion projecting over the front face of the magnet so as to form a portion of a tunnel for the flux distributor; and two tie plates which extend along opposite side faces of the magnet and which are fastened exclusively to the pole shoes to clamp the ends of the magnet between the pole shoes and form a structural unit of the members and which have portions extending in opposite directions over the rear face of the magnet to hold the magnet between them and the front portion of the pole shoe.

6. A magnet stator structure which is constructed and arranged to be fastened as a unit in predetermined fixed position in the frame of that type of magneto having a rotary flux distributor and a stationary generating coil and which includes the following members: a permanent magnet of bar form having opposite polar ends; laminated pole shoes which are arranged on respective ends of the magnet free from direct attachment thereto so as to form a portion of a tunnel for the flux distributor and which have portions projecting over a part of the front face of the magnet and at least one of which has an integral projecting arm adapted for magnetic contact with the core of the generating coil; tie plates which extend along opposite side faces of the magnet and which have portions extending oppositely over the rear face of the magnet to hold the magnet between them and the front portions of the pole shoes; and rivets which fasten the tie plates to the pole shoes exclusively to clamp the ends of the magnet between the pole shoes and which also fasten the laminations of the pole shoes in respective stacks, to form a structural unit of the members.

7. A magnet stator structure which is constructed and arranged to be fastened as a unit in predetermined fixed position in the frame of that type of magneto having a rotary flux distributor and a stationary generating coil and which includes the following members: two permanent magnets of bar form displaced from each other and each having opposite polar ends; pole shoes which are arranged at respective ends of respective magnets free from direct attachment thereto so as to form a tunnel for the flux distributor and of which one pole shoe of each magnet has arms projecting in like direction so as to be adapted for magnetic contact with the core of the generating coil; and a tie plate which is fastened exclusively to the four pole shoes and which clamps the ends of the two magnets between its pole shoes to form a structural unit of the members.

8. A magnet stator structure which is constructed and arranged to be fastened as a unit in predetermined fixed position in the frame of that type of magneto having a rotary flux distributor and a stationary generating coil and which includes the following members: two permanent magnets of bar form displaced from each other and each having opposite polar ends; pole shoes which are arranged at respective ends of respective magnets free from direct attachment thereto so as to form a tunnel for the flux distributor and of which one pole shoe of each magnet has arms projecting in like direction so as to be adapted for magnetic contact with the core of the generating coil; for each magnet a tie plate which is fastened exclusively to the pole shoes thereof and which clamps the ends of the magnet between the pole shoes; and a cross member connecting the tie plates to form a structural unit of all the members.

9. A magnet stator structure which is constructed and arranged to be fastened as a unit in predetermined fixed position in the frame of that type of magneto having a rotary flux distributor and a stationary generating coil and which includes the following members: two permanent magnets of bar form displaced from each other and each having opposite polar ends; pole shoes which are arranged at respective ends of respective magnets free from direct attachment thereto so as to form a tunnel for the flux distributor and of which one pole shoe of each magnet has arms projecting in like direction so as to be adapted for magnetic contact with the core of the generating coil; for each magnet two tie plates which extend along opposite side faces of the magnet and which are fastened exclusively to the pole shoes to clamp the ends of the magnet between the pole shoes; and cross members connecting respective tie plates of the magnets to form a structural unit of all the members.

10. A magnet stator structure which is constructed and arranged to be fastened as a unit in predetermined fixed position in the frame of that type of magneto having a rotary flux distributor and stationary generating coils and which includes the following members: two permanent magnets of bar form displaced from each other and each having opposite polar ends; pole shoes which are arranged at respective ends of respective magnets free from direct attachment thereto and which have portions extending over the front face of respective magnets so as to form a tunnel for the flux distributor and also have arms adapted for magnetic contact with the cores of respective generating coils; and tie plates, with integral cross members, which are fastened exclusively to all the pole shoes along opposite side faces of the magnets to clamp the ends of the respective magnets between respective pole shoes and to form a structural unit of all the members and which have portions extending in opposite directions over the rear face of respective magnets to hold each magnet between them and the front portion of its pole shoes.

11. A magnet stator structure which is adapted to be fastened as a unit in a magneto frame in a predetermined fixed position therein and which includes the following members; a permanent magnet having upper and lower polar ends; laminated pole shoes for the polar ends of the magnet, both of which pole shoes are free from direct attachment to the magnet and of which at least the upper one has an upwardly projecting integral arm adapted for magnetic association with the core of a generating coil of the magneto, said pole shoes having relatively thick outside laminations; and tie plates which are fastened exclusively to the pole shoes on opposite side faces thereof to hold the pole shoes on the magnet and by which a structural unit of the members is formed by merely clamping the magnet between the pole shoes, said tie plates extending from the bottom of the lower pole shoe to a point short of the upper end of the upper pole shoe.

12. A magnet stator structure which is adapted to be fastened as a unit in a magneto frame in a predetermined fixed position therein and which includes the following members: a permanent magnet having upper and lower polar ends; pole shoes for the polar ends of the magnet composed of laminations of uniform thickness throughout, both of which pole shoes are free from direct attachment to the magnet and at least the upper one of which has an upwardly projecting integral arm adapted for magnetic association with the core of a generating coil of the magneto; and tie plates which are fastened exclusively to the pole shoes on opposite side faces thereof, to hold the pole shoes on the polar ends of the magnet and by which a structural unit of the members is formed by merely clamping the magnet between the pole shoes, said tie plates extending from the bottom of the lower pole shoe to the top of said arm.

WOLFGANG E. SCHWARZMANN.
CHARLES STRNISTE.